(12) United States Patent
Shoge

(10) Patent No.: US 6,641,500 B2
(45) Date of Patent: Nov. 4, 2003

(54) BICYCLE HUB TRANSMISSION WITH A POWER CONTROL MECHANISM FOR A SHIFT ASSIST MECHANISM

(75) Inventor: Akihiko Shoge, Shimonoseki (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 10/033,647

(22) Filed: Dec. 27, 2001

(65) Prior Publication Data

US 2003/0130079 A1 Jul. 10, 2003

(51) Int. Cl.[7] ................................. F16H 3/62
(52) U.S. Cl. ................. 475/276; 475/331; 192/48.92
(58) Field of Search ...................... 475/276, 331, 475/277, 288, 289; 280/259, 260; 192/48.92

(56) References Cited

U.S. PATENT DOCUMENTS

| | | | | |
|---|---|---|---|---|
| 5,322,487 A | * | 6/1994 | Nagano | 475/297 |
| 5,535,855 A | | 7/1996 | Hanada | 188/24.14 |
| 5,556,354 A | * | 9/1996 | Meier-Burkamp | 475/275 |
| 5,562,563 A | | 10/1996 | Shoge | 475/298 |
| 5,961,416 A | * | 10/1999 | Shoge | 475/297 |
| 5,967,937 A | | 10/1999 | Matsuo | 475/297 |
| 5,971,884 A | * | 10/1999 | Yoo | 475/298 |
| 6,368,243 B1 | * | 4/2002 | Liu | 475/298 |
| 6,478,128 B2 | * | 11/2002 | Taylor | 192/64 |
| 6,478,710 B1 | * | 11/2002 | Steuer et al. | 475/289 |

* cited by examiner

Primary Examiner—Richard M. Lorence
Assistant Examiner—David D. Le
(74) Attorney, Agent, or Firm—James A. Deland

(57) ABSTRACT

A hub transmission for a bicycle comprises a hub axle; a driver rotatably supported to the hub axle; a hub shell rotatably supported to the hub axle; a power transmitting mechanism disposed between the driver and the hub shell for communicating rotational power from the driver to the hub shell through a plurality of power transmission paths; a shift mechanism for selecting the plurality of power transmission paths; a shift assist mechanism for communicating rotational power from the driver to the shift mechanism; and a power control mechanism disposed between the driver and the shift assist mechanism and coupling the driver to the shift assist mechanism for controlling an amount of rotational power communicated from the driver to the shift mechanism.

35 Claims, 13 Drawing Sheets

BICYCLE HUB TRANSMISSION WITH A POWER CONTROL MECHANISM FOR A SHIFT ASSIST MECHANISM

BACKGROUND OF THE INVENTION

The present invention is directed to bicycle transmissions and, more particularly, to an internally mounted multi-speed hub transmission for a bicycle.

An internally-mounted multi-speed hub transmission sometimes is mounted to the rear wheel of a bicycle so that the rider can select different gear ratios to vary the pedaling effort. A typical hub transmission includes a hub axle that is mounted to the bicycle frame, a driver rotatably supported to the hub axle for receiving the pedaling force through a sprocket and chain, and a hub shell rotatably supported to the hub axle. A power transmitting mechanism is disposed between the driver and the hub shell for communicating rotational power from the driver to the hub shell through a plurality of power transmission paths, wherein each power transmission path typically produces a unique gear ratio. The power transmitting mechanism ordinarily comprises a planetary gear mechanism including one or more sun gears rotatably supported around the hub axle, a ring gear rotatably supported around the hub axle, a planet gear carrier rotatably supported around the hub axle, and a plurality of planet gears rotatably supported to the planet gear carrier and meshing with the sun gear and the ring gear. The plurality of power transmission paths and the corresponding gear ratios are selected by selectively nonrotatably coupling the various components to each other. For example, one gear ratio may be selected by nonrotatably coupling a sun gear to the hub axle, another gear ratio may be selected by nonrotatably coupling the driver relative to the planet gear carrier, and another gear ratio may be selected by nonrotatably coupling the driver relative to the ring gear. Many such coupling relationships often are possible in a typical hub transmission, thus resulting in a relatively large number of possible gear ratios.

A shift mechanism is usually provided for selecting the plurality of power transmission paths. The shift mechanism may comprise a shift sleeve that surrounds the axle such that rotation of the shift sleeve controls the nonrotatable coupling of the various components. Such a shift sleeve ordinarily is coupled to an actuator member outside the hub, wherein rotation of the actuator member is controlled by a shift control device mounted to the handlebar or by a motor that is electronically controlled by the rider. When the rider exerts a large amount of force on the pedals to accelerate the bicycle quickly, a very large amount of force is applied to the internal components of the hub, thus creating significant resistance to the shifting operation. Such resistance results in excessive manual shifting effort required by the rider or in unacceptable strain on the motor that drives the actuator member.

U.S. patent application Ser. No. 09/522,703 filed Mar. 10, 2000 by the present applicant discloses an apparatus that uses the rotational power of the hub itself to assist the shifting operation when significant drive force is applied to the hub. That apparatus senses when the shift sleeve experiences significant resistance to the shifting operation. Such resistance activates a pawl mechanism coupled to the shift sleeve so that the pawl mechanism engages a ratchet mechanism formed on the inner peripheral surface of the driver. The rotational power of the driver is thus communicated to the shift sleeve, and the shift sleeve is rotated to complete the shifting operation. Because of the firm coupling between the driver and the shift sleeve through the pawl mechanism, there is a possibility that a component in the hub could be damaged if that component is unable to complete the shifting operation. Thus, it is desirable to ensure that such damage does not occur.

SUMMARY OF THE INVENTION

The present invention is directed to a bicycle hub transmission having a shift assist function wherein the amount of assisting force is controlled to avoid damage to the hub. In one embodiment of the present invention, a hub transmission for a bicycle comprises a hub axle; a driver rotatably supported to the hub axle; a hub shell rotatably supported to the hub axle; a power transmitting mechanism disposed between the driver and the hub shell for communicating rotational power from the driver to the hub shell through a plurality of power transmission paths; a shift mechanism for selecting the plurality of power transmission paths; a shift assist mechanism for communicating rotational power from the driver to the shift mechanism; and a power control mechanism disposed between the driver and the shift assist mechanism and coupling the driver to the shift assist mechanism for controlling an amount of rotational power communicated from the driver to the shift mechanism.

In a more specific embodiment, an actuator member may be rotatably supported by the hub axle, and a shift control sleeve may be rotatably supported by the hub axle, wherein the shift control sleeve is operatively coupled to the actuator member for rotating in response to the rotation of the actuator member. In this case the shift assist mechanism may communicate rotational power from the driver to the shift sleeve. If desired, the power control mechanism may comprise a first power control member operatively coupled to the driver for rotation in response to rotation of the driver and a second power control member engaging the first power control member. The first power control member may rotate together with the second power control member until the second power control member significantly resists rotation of the first power control member whereupon the first power control member rotates relative to the second power control member. If desired, the first power control member may contact the second power control member, and a power control biasing member may be provided for biasing the first power control member and the second power control member towards each other.

DETAILED DESCRIPTION OF THE EMBODIMENTS

Figure 1:
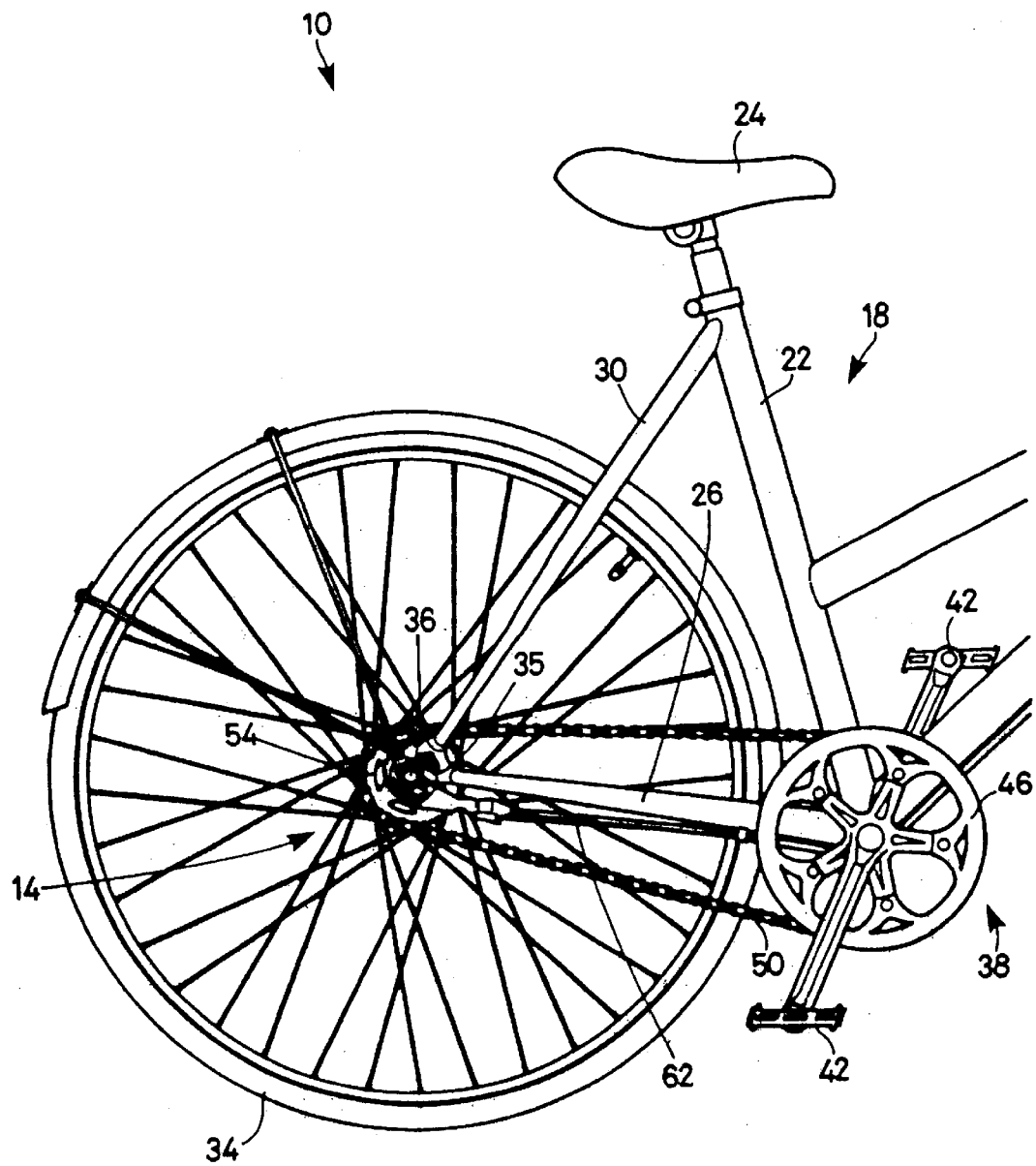
FIG. 1 is a side view of a rear of a bicycle that includes a hub transmission.

FIG. 1 is a side view of a rear of a bicycle 10 that includes a particular embodiment of a hub transmission 14 that incorporates many inventive features. The rear portion of bicycle 10 includes a frame 18 with a seat tube 22 supporting a saddle 24, a pair of conventional chain stays 26, and a pair of conventional seat stays 30. A wheel 34 is rotatably supported by a frame end 35 around an axle 36 of hub transmission 14 at the intersection of chain stays 26 and seat stays 30, and a crank assembly 38 having pedals 42 and a chain ring 46 is rotatably supported at the intersection of seat tube 22 and chain stays 26. A chain 50 engages chain ring 46 and wraps around a sprocket 54 that rotatably drives hub transmission 14. A Bowden-type control cable 62 is used to change gear ratios in hub transmission 14 in a manner described more fully below.

Figure 2:
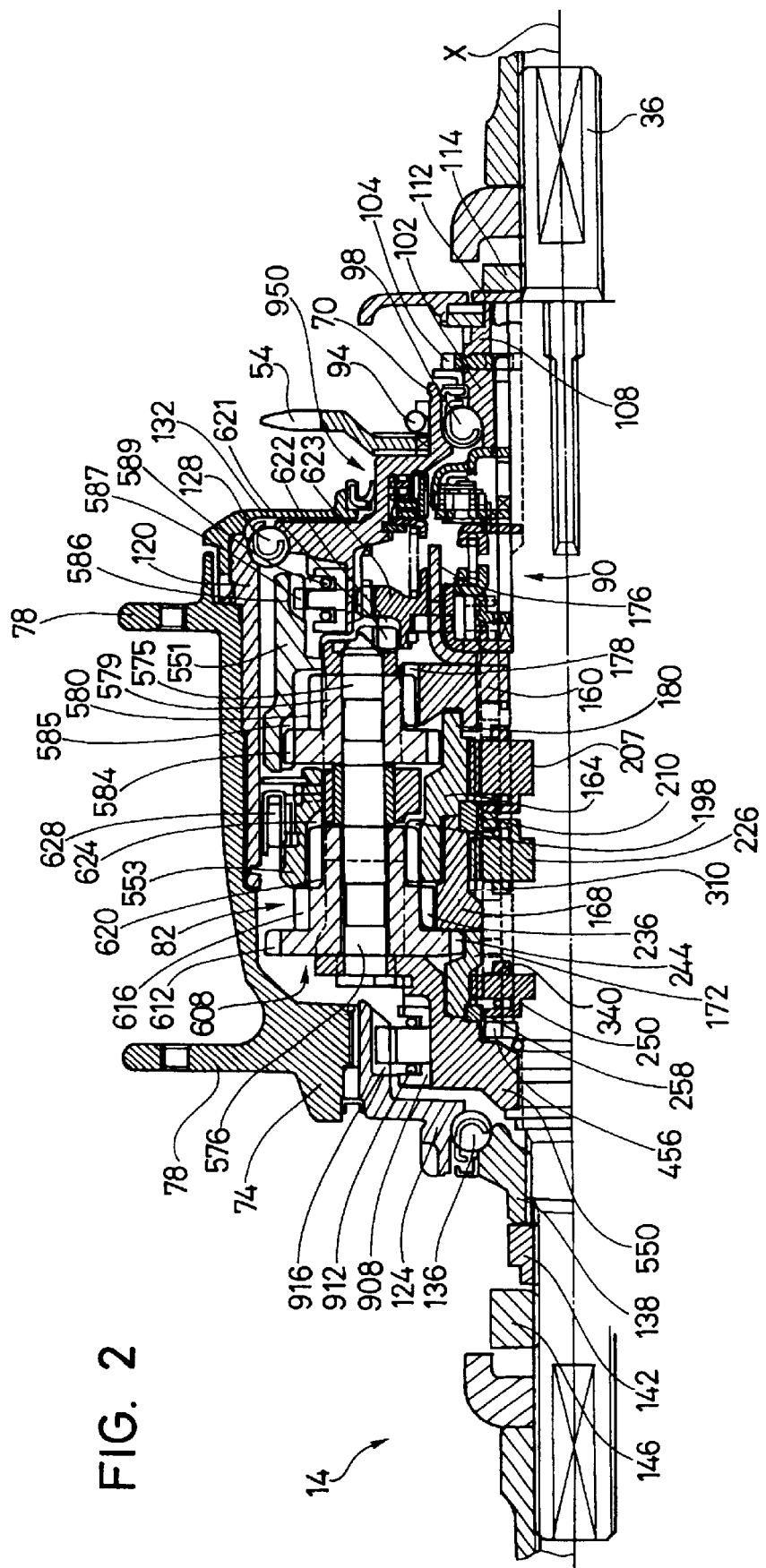
FIG. 2 is cross sectional view of a particular embodiment of a hub transmission according to the present invention.

FIG. 2 is cross sectional view of a particular embodiment of hub transmission 14. As shown in FIG. 2, hub transmission 14 includes axle 36, a driver 70 rotatably supported to axle 36, a hub shell 74 including spoke flanges 78 rotatably supported to axle 36, a power transmitting mechanism 82 disposed between driver 70 and hub shell 74 for communicating rotational power from driver 70 to hub shell 74 through a plurality of power transmission paths, and a shift/assist mechanism 90 for controlling the selection of the plurality of power transmission paths and for using the rotational power of driver 70 to help change the power transmission paths in power transmitting mechanism 82.

Sprocket 54 is coupled to driver 70 in a splined manner using a snap ring 94, and driver 70 is rotatably supported on axle 36 through ball bearings 98 and a bearing cone 102. Bearing cone 102 is maintained in place by an actuator plate 104, a spacer 108, a washer 112 and a lock nut 114.

A right cup 120 is nonrotatably fitted at the right side inner peripheral surface of hub shell 74, and a left cup 124 is nonrotatably fitted at the left side inner peripheral surface of hub shell 74. Right cup 120 rotatably supports hub shell 74 to driver 70 through ball bearings 128, and the internal components at the right side of hub transmission 14 are protected from external contaminants by a sealing cup 132 fitted over right cup 120. Left cup 124 rotatably supports hub shell 74 on axle 36 through ball bearings 136 and a cone 138. Cone 138 is maintained on axle 36 by a stop nut 142 and a lock nut 146.

Figure 3:
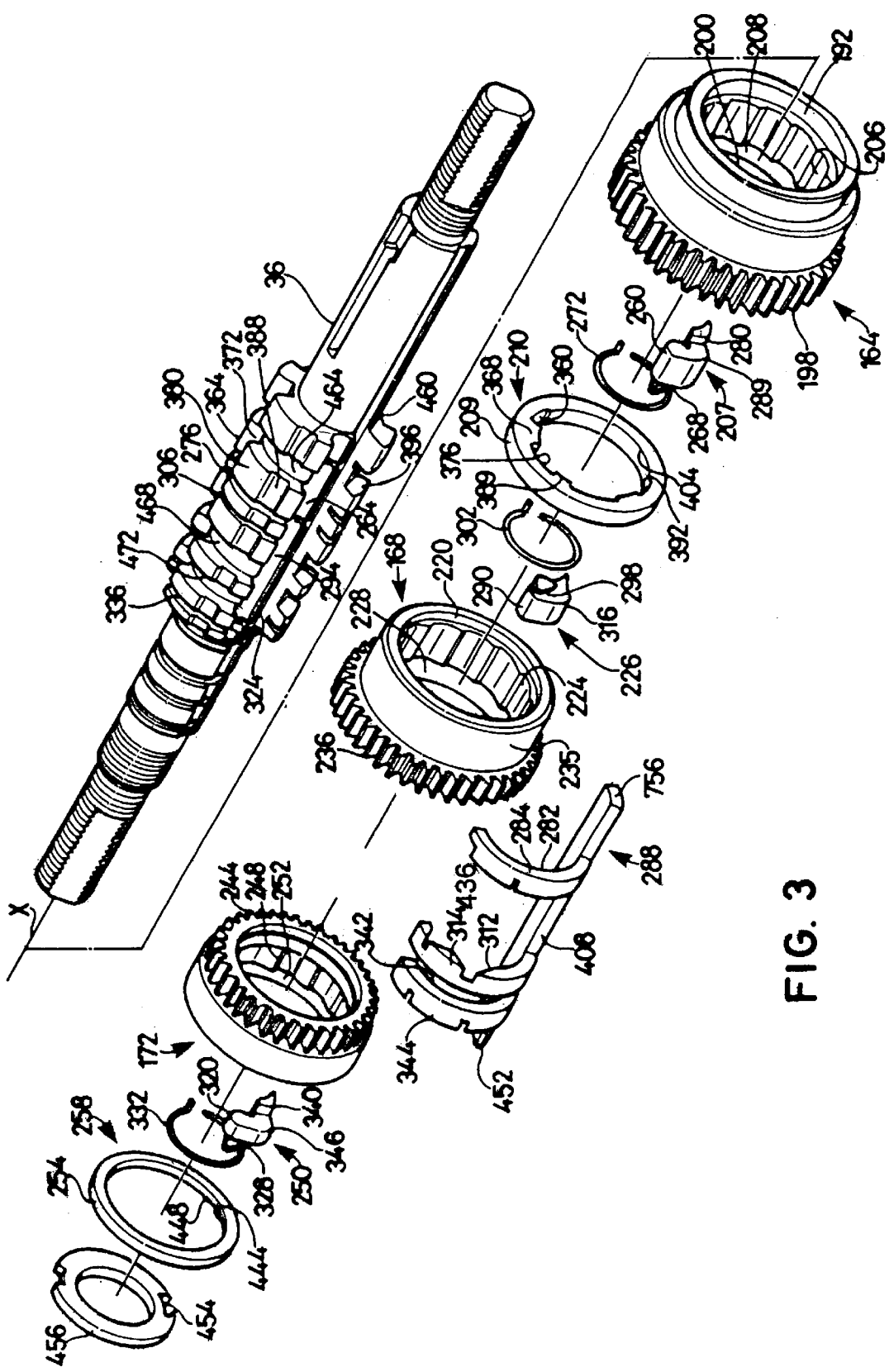
FIG. 3 is an exploded view of a particular embodiment of an axle and sun gear apparatus used in the hub transmission.

As shown in FIGS. 2 and 3, power transmitting mechanism 82 includes a first sun gear 160, a separate second sun gear 164, a separate third sun gear 168, and a separate fourth sun gear 172. First sun gear 160 is nonrotatably supported to axle 36, and it includes a clutch cam portion 176, a plurality of first sun gear teeth 178 (e.g., 48T) formed on an outer peripheral surface thereof, and an outer peripheral second sun gear contact surface 180. Second sun gear 164 is rotatably supported around axle 36 adjacent to first sun gear 160, and, as shown more clearly in FIG. 3, it includes an inner peripheral first sun gear contact surface 192 for slidably contacting second sun gear contact surface 180 on first sun gear 160, a plurality of second sun gear ratchet teeth 206 (e.g., 12T) formed on an inner peripheral surface thereof for engaging a second sun gear pawl 207, an inner peripheral guide ring contact surface 208 for slidably contacting an outer peripheral surface 209 of a sun gear guide ring 210, an inner peripheral third sun gear contact surface 200, and a plurality of second sun gear teeth 198 (e.g., 48T) formed on an outer peripheral surface thereof. Third sun gear 168 is rotatably supported around axle 36 adjacent to second sun gear 164, and it includes an inner peripheral first guide ring contact surface 220 for slidably contacting the outer peripheral surface 209 of sun gear guide ring 210, a plurality of third sun gear ratchet teeth 224 (e.g., 12T) formed on an inner peripheral surface thereof for engaging a third sun gear pawl 226, an outer peripheral second sun gear contact surface 235 for slidably contacting third sun gear contact surface 200 on second sun gear 164, and a plurality of third sun gear teeth 236 (e.g., 42T) formed on an outer peripheral surface thereof. Fourth sun gear 172 includes a plurality of fourth sun gear teeth 244 (e.g., 36T) formed on an outer peripheral surface thereof, a plurality of fourth sun gear ratchet teeth 248 (e.g., 12T) formed on an inner peripheral surface thereof for engaging a fourth sun gear pawl 250, and an inner peripheral guide ring contact surface 252 for slidably contacting the outer peripheral surface 254 of a guide ring 258.

Pawl 207 includes a pawl seat 260 that is pivotably seated in a pawl receiving groove 264 formed in axle 36, a spring receiving groove 268 for receiving a spring 272 mounted in a spring receiving groove 276 formed in axle 36, a pawl control surface 280 for contacting an inner peripheral surface 282 of a pawl control arm 284 of a shift control sleeve 288, and a pawl tooth 289 for engaging second sun gear ratchet teeth 206. Similarly, pawl 226 includes a pawl seat 290 that is pivotably seated in a pawl receiving groove 294 formed in axle 36, a spring receiving groove 298 for receiving a spring 302 mounted in a spring receiving groove 306 formed in axle 36, a pawl control surface 310 (FIG. 2) for contacting an inner peripheral surface 312 of a pawl control arm 314 of shift control sleeve 288, and a pawl tooth 316 for engaging third sun gear ratchet teeth 224. Finally, pawl 250 includes a pawl seat 320 that is pivotably seated in a pawl receiving groove 324 formed in axle 36, a spring receiving groove 328 for receiving a spring 332 mounted in a spring receiving groove 336 formed in axle 36, a pawl control surface 340 for contacting an inner peripheral surface 342 of a pawl control arm 344 of shift control sleeve 288, and a pawl tooth 346 for engaging fourth sun gear ratchet teeth 248. Pawl teeth 289, 316 and 346 of pawls 207, 226 and 250 are biased radially outwardly by their respective springs 272, 302 and 332 in a well known manner.

In this embodiment, half of sun gear guide ring 210 is fitted between guide ring contact surface 208 of second sun gear 164 and axle 36, and the other half of sun gear guide ring 210 is fitted between first guide ring contact surface 220 of third sun gear 168 and axle 36. In addition to outer peripheral surface 209, sun gear guide ring 210 includes a locking recess 360 for engaging a locking ridge 364 formed intermittently in the direction of axis X on axle 36, a locking projection 368 for engaging a locking groove 372 formed intermittently in the direction of axis X on axle 36, a locking recess 376 for engaging a locking ridge 380 formed intermittently in the direction of axis X on axle 36, a locking projection 389 for engaging a locking recess 388 formed intermittently in the direction of axis X on axle 36, a locking groove 392 for engaging a locking ridge 396 formed intermittently in the direction of axis X on axle 36, and a control sleeve support surface 404 for supporting a base sleeve 408 of shift control sleeve 288 between sun gear guide ring 210 and axle 36.

Sun gear guide ring 254 is fitted between guide ring contact surface 252 of fourth sun gear 172 and axle 36. Unlike sun gear guide ring 210, sun gear guide ring 254 has a circular inner peripheral surface 444 that is fitted around locking ridges 364, 380 and 396 on axle 36. A portion of inner peripheral surface 444 forms a control sleeve support surface 448 for supporting an end 452 of base sleeve 408 between sun gear guide ring 258 and axle 36. End 452 of base sleeve 408 terminates in a groove 454 in a washer 456.

Base sleeve 408 of shift control sleeve 288 is rotatably fitted within a control sleeve groove 460 formed in the direction of axis X on axle 36, and sun gear guide rings 210 and 258 support it radially outwardly. Pawl control arms 284, 314 and 344 are slidably disposed in control arm grooves 464, 468 and 472, respectively, formed circumferentially in axle 36. The detailed structure and operation of shift control sleeve 288 is known and is further described in U.S. patent application Ser. No. 09/522,703 filed Mar. 10, 2000.

Figure 4:
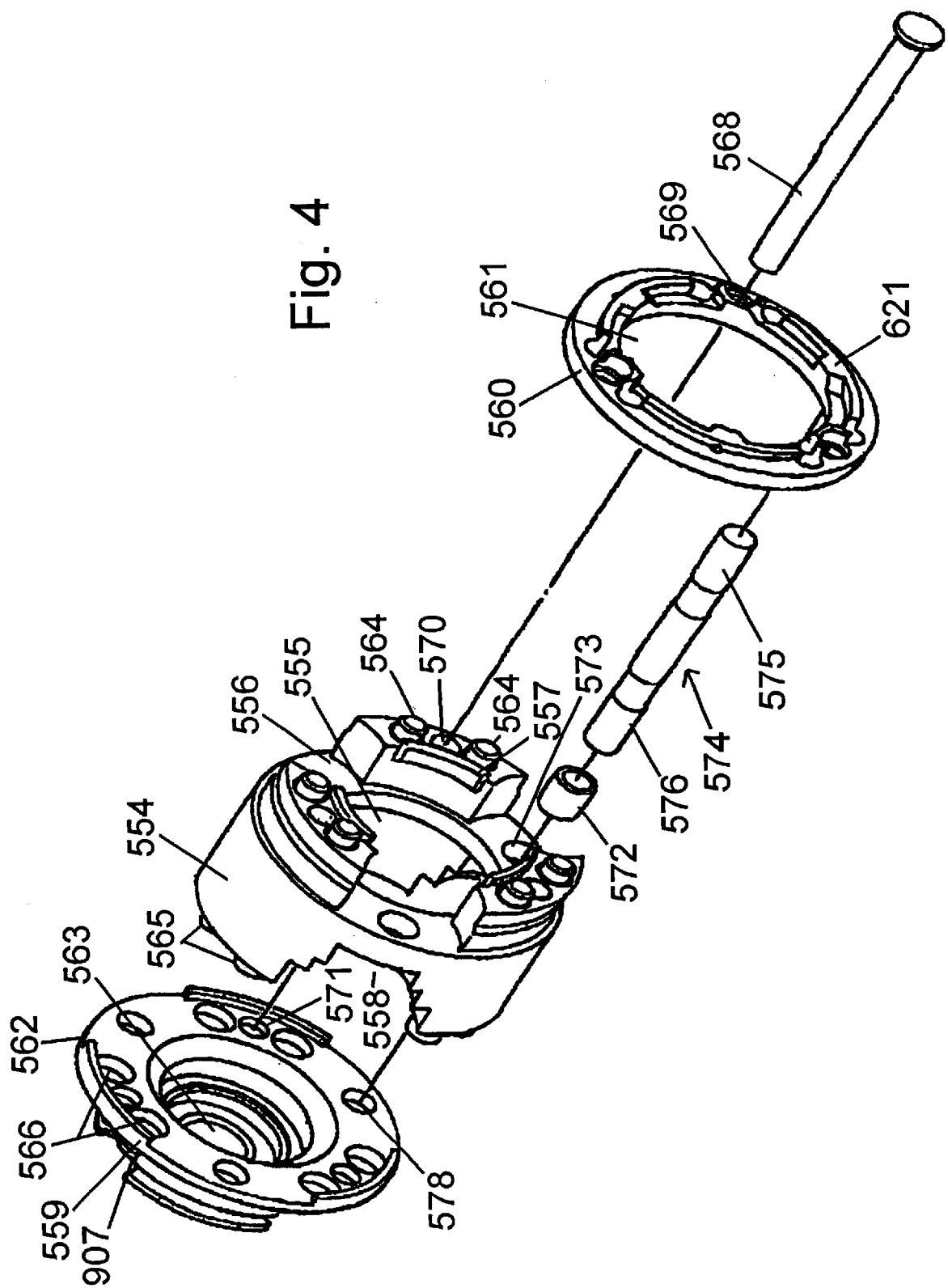
FIG. 4 is an exploded view of a particular embodiment of a planet gear carrier.
Figure 6:
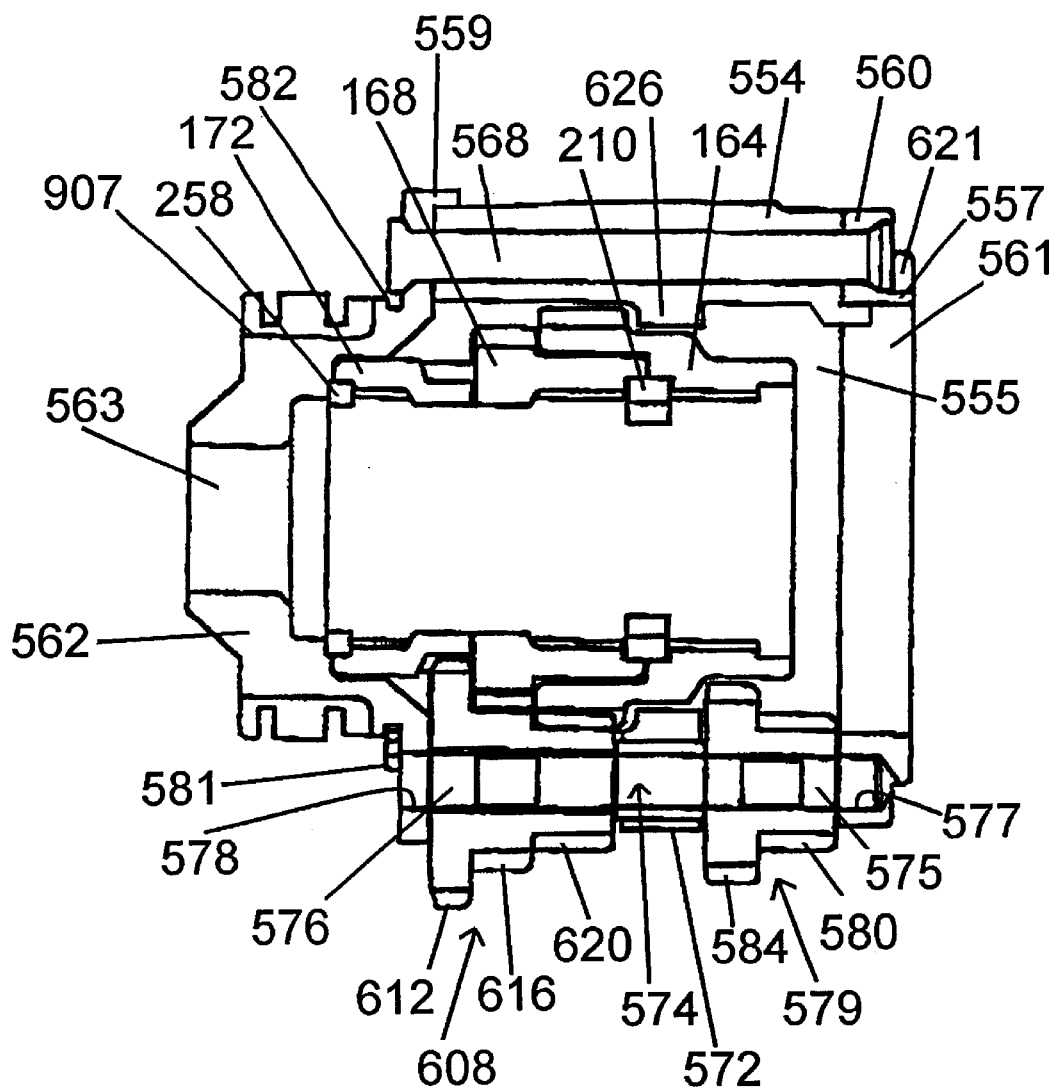
FIG. 6 is a side cross sectional view of the planet gear carrier in an assembled state.

As shown in FIG. 2, power transmitting mechanism 82 further comprises a planet gear carrier 550, a first ring gear 551 and a second ring gear 553, all of which are rotatably mounted around axle 36. As shown in FIGS. 4 and 6, planet gear carrier 550 comprises a first carrier member 554 which has a first carrier member axle opening 555 for receiving axle 36 therethrough, a plurality of (e.g., three) first planet gear openings 556 that extend through the side of first carrier member 554 for receiving a plurality of first planet gears 579 therein, and a plurality of (e.g., three) larger second planet gear openings 558 that extend through the opposite side of first carrier member 554 for receiving a plurality of second planet gears 608 therein; a separate second carrier member 560 having a second carrier member axle opening 561 for receiving axle 36 therethrough; and a separate third carrier member 562 having a third carrier member axle opening 563 for receiving axle 36 therethrough. In this embodiment, first carrier member 554 is constructed from a light alloy metal such as an aluminum alloy, whereas second carrier member 560 and third carrier member 562 are constructed from a stronger metal such as steel.

Figure 5:
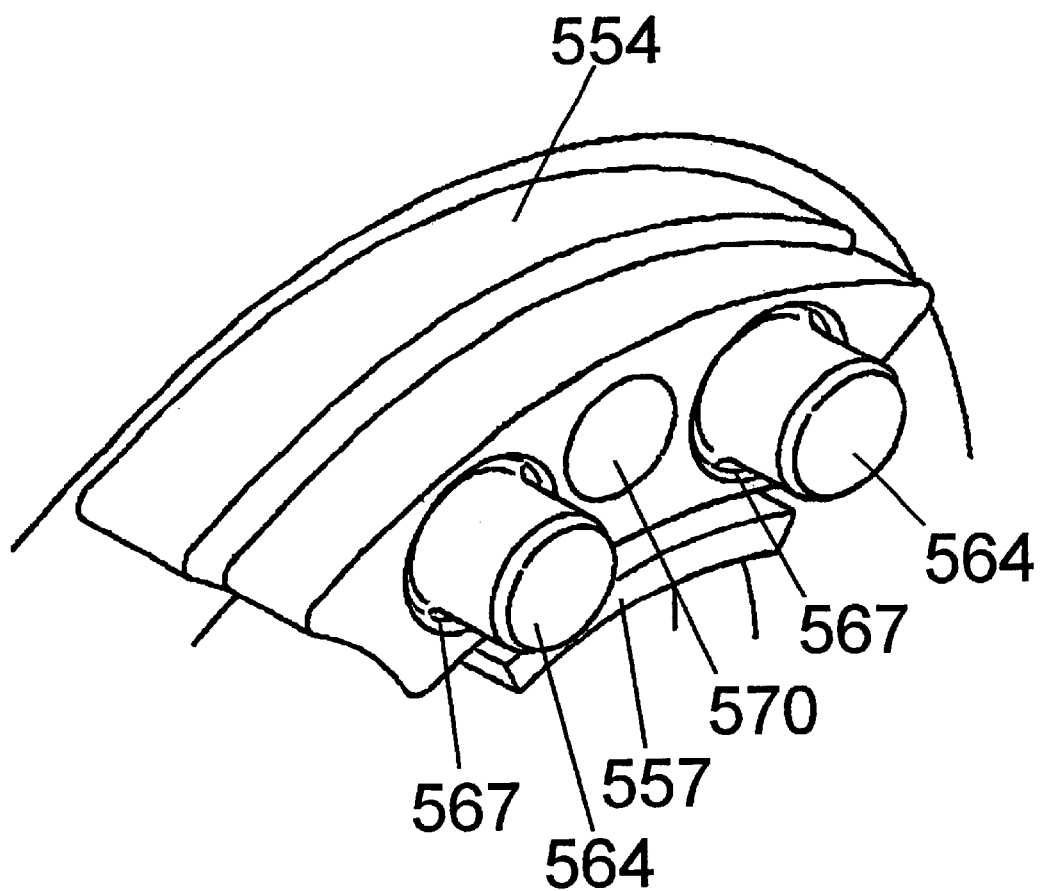
FIG. 5 is a detailed view of coupling members shown in FIG. 4.

Three pairs of first carrier pins 564 are provided for nonrotatably coupling first carrier member 554 to second carrier member 560, wherein each pair of first carrier pins 564 is disposed between a corresponding pair of first planet gear openings 556. Similarly, three pairs of second carrier pins 565 are provided for nonrotatably coupling first carrier member 554 to third carrier member 562, wherein each pair of second carrier pins 565 is disposed between a corresponding pair of second planet gear openings 558. In this embodiment, each first planet gear opening 556 is located directly opposite a corresponding second planet gear opening 558, and each pair of first carrier pins 564 is located opposite a corresponding pair of second carrier pins 565. First carrier pins 564 and second carrier pins 565 function as couplers for first carrier member 554, second carrier member 560 and third carrier member 562, and they are press fit into and extend from the sides of first carrier member 554. First carrier pins 564 are press fit into bores (not shown) formed in second carrier member 560, and second carrier pins 565 are press fit into bores 566 formed in third carrier member 562. First carrier member 554 is designed to directly contact second carrier member 560 and third carrier member 562. To facilitate such a coupling, a groove, recess or other debris space 567 surrounds each carrier pin as shown in FIG. 5 to act as a receptacle for any debris caused by chipping or shaving of the pins or the carrier members as the carrier members are pressed together. Furthermore, three guide ribs 557 extend from the inner peripheral surface of first carrier member 554 radially inwardly of each pair of carrier pins 564 for engaging the inner peripheral surface of second carrier member 560, and three guide ribs 559 extend from the outer peripheral surface of third carrier member 562 radially outwardly of each pair of bores 566 for engaging the outer peripheral surface of first carrier member 554. Guide ribs 557 and 559 facilitate assembly and help to further strengthen the coupling between first carrier member 554, second carrier member 560 and third carrier member 562.

Three rivets 568 (only one is shown in FIGS. 4 and 6) securely couple first carrier member 554, second carrier member 560 and third carrier member 562 together. Each rivet 568 extends through an opening 569 in second carrier member 560, through an opening 570 in first carrier member 554 and through an opening 571 in third carrier member 562 so that a rivet is disposed between each pair of first carrier pins 564 and each pair of second carrier pins 565. Three bushings 572 (only one is shown in FIGS. 4 and 6) are press fit into three corresponding openings 573 in first carrier member 554 for supporting three master pinion pins 574 (only one is shown in FIGS. 4 and 6), each comprising a first pinion pin 575 formed as one piece with a second pinion pin 576. The master pinion pins 574 extend through first carrier member 554 such that each first pinion pin 575 is disposed in a first planet gear opening 556 and supported in a blind bore 577 formed in second carrier member 560, and each second pinion pin 576 is disposed in a second planet gear opening 558 and supported in an opening 578 formed in third carrier member 562. Master pinion pin 574 is axially fixed within planet gear carrier 550 by a stopper ring 581 (FIG. 6) fitted within a stopper ring groove 582 formed on the outer peripheral surface of third carrier member 562. Each first pinion pin 575 rotatably supports a first planet gear 579, wherein each first planet gear 579 has a small diameter gear portion 580 (e.g., 14T) engaging the plurality of first sun gear teeth 178 on first sun gear 160, and a large diameter gear portion 584 (e.g., 22T) engaging a first inner peripheral gear portion 585 (e.g., 84T) of first ring gear 551. Similarly, each second pinion pin 576 rotatably supports a second planet gear 608, wherein each second planet gear 608 includes a large diameter gear portion 612 (e.g., 29T) engaging the plurality of fourth sun gear teeth 244 on fourth sun gear 172, an intermediate diameter gear portion 616 (e.g., 18T) engaging the plurality of third sun gear teeth 236 on third sun gear 168, and a small diameter gear portion 620 (e.g., 14T) engaging the plurality of second sun gear teeth 198 on second sun gear 164 as well as an inner peripheral gear portion 624 (e.g., 78T) of second ring gear 553.

First carrier member 554 further includes a radially inwardly extending wall 626 for axially retaining second sun gear 164. Second carrier member 560 includes a plurality (e.g., 12) of circumferentially disposed clutch engaging splines 621 on its right side for engaging a complementary plurality of planet gear carrier engaging splines 622 formed on a clutch ring 623. Third carrier member includes a plurality of (e.g., three) pawl receiving recesses 907 on an outer peripheral surface thereof for supporting a corresponding plurality of circumferentially disposed pawls 908 (FIG. 2). Pawls 908 are biased radially outwardly by pawl springs 912 for engaging an inner peripheral gear 916 formed on the right side of left cup 124. Pawls 908 communicate forward rotation of planet gear carrier 550 to left cup 124 and hence to hub shell 74.

In addition to the inner peripheral gear portion 585, first ring gear 551 includes a second inner peripheral gear portion 586 (e.g., 36T) for engaging a plurality of circumferentially disposed pawls 587 that are mounted an outer peripheral surface of driver 70. Pawls 587 are biased radially outwardly by a pawl spring 589 and thus function as a one-way clutch between driver 70 and first ring gear 551. Second ring gear 553 is coupled to right cup 120, and hence to hub shell 74, through a one-way clutch in the form of a roller clutch 628 having, e.g., 18 rollers and cam surfaces.

Figure 7:
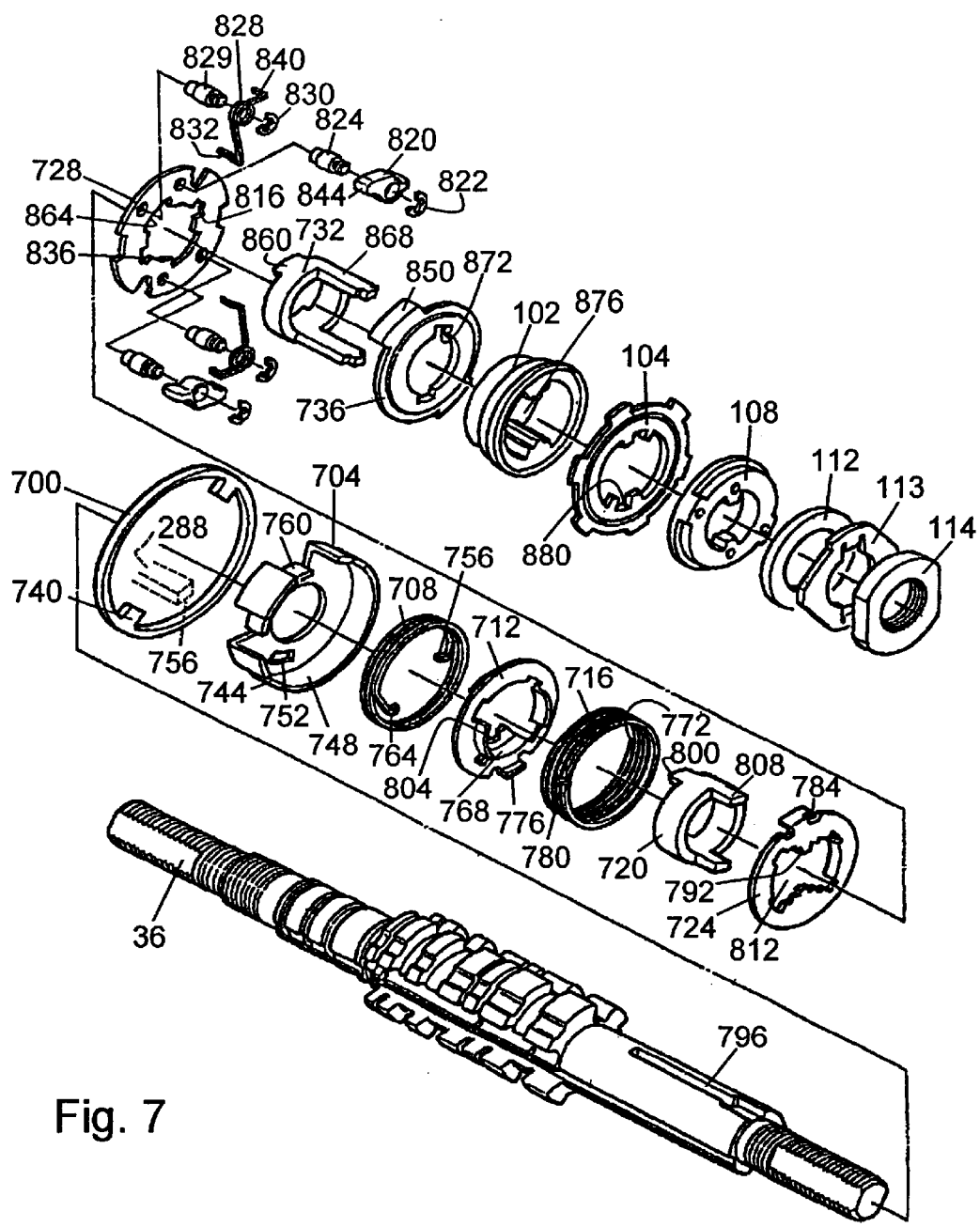
FIG. 7 is an exploded view of a portion of a shift/assist mechanism used in the hub transmission.
Figure 8:
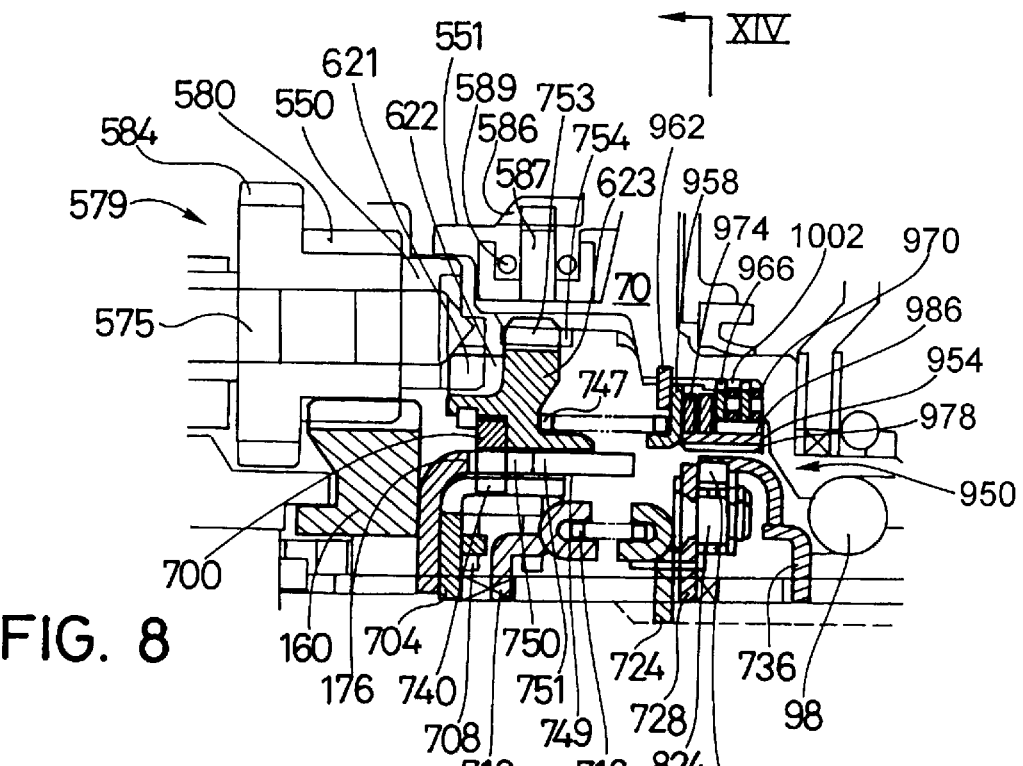
FIG. 8 is a detailed view showing the shift/assist mechanism including a particular embodiment of a power control mechanism according to the present invention in an inoperative state.
Figure 9:
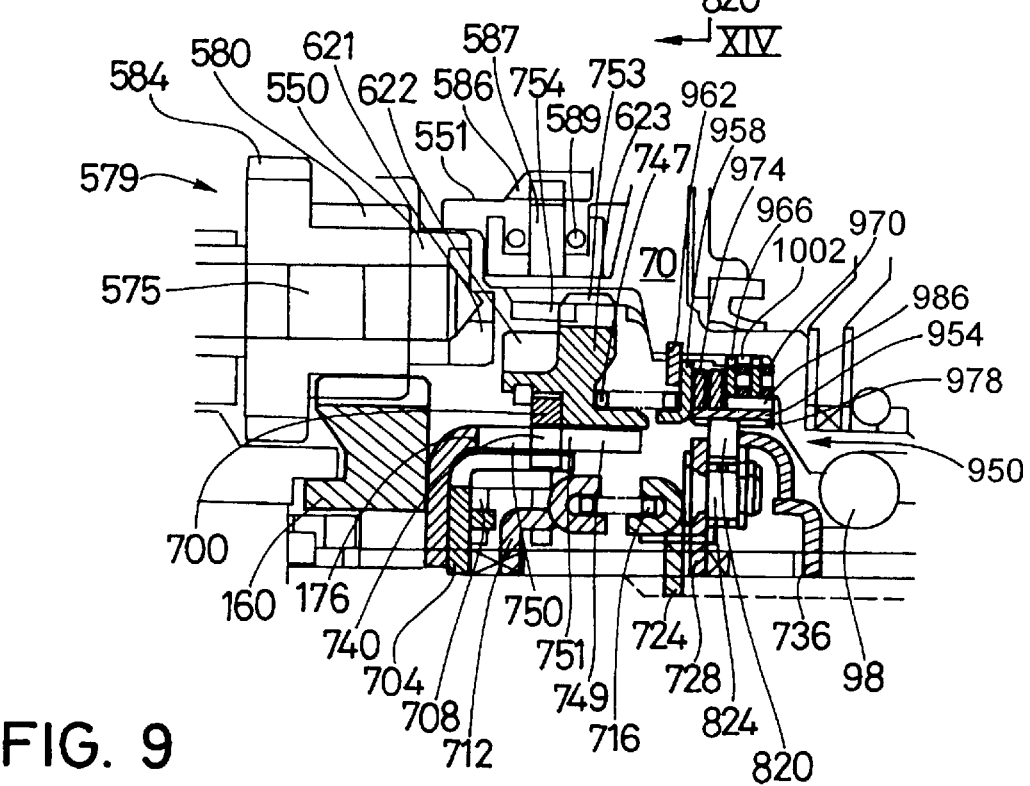
FIG. 9 is a detailed view showing the shift/assist mechanism including the power control mechanism in an operative state.

FIG. 7 is an exploded view of the portions of shift/assist mechanism 90 that are mounted to axle 36. FIG. 8 is a detailed view showing shift/assist mechanism 90 when clutch ring 623 is coupled to planet gear carrier 550, and FIG. 9 is a detailed view showing shift/assist mechanism 90 when clutch ring 623 is uncoupled from planet gear carrier 550. As shown in those Figures, shift/assist mechanism 90 includes a ring-shaped shift key member 700, a shift key member guide 704, a saver spring 708, a spring washer 712, a return spring 716, a shift sleeve 720, a spring washer 724, a pawl support 728, a shift sleeve 732, and a pawl control washer 736. Shift key member 700 includes radially inwardly extending cam followers 740 that extend through clutch cam portion 176 of first sun gear 160 (FIG. 8) into axially extending grooves 744 formed in a side wall 748 of shift key member guide 704. As shown in FIGS. 8 and 9, clutch cam portion 176 of first sun gear 160 includes a cam surface 749 defining a first cam step 750 and a second cam step 751. Also, clutch ring 623 is biased to the left by a clutch bias spring 747. Thus, when shift key member 700 is in the position shown in FIG. 8, planet gear carrier engaging splines 622 on clutch ring 623 engage clutch engaging splines 621 on planet gear carrier 550, and a plurality of circumferentially disposed driver engaging splines 753 on clutch ring 623 nonrotatably engage a complementary plurality of clutch engaging splines 754 on driver 70 so that driver 70, clutch ring 623 and planet gear carrier 550 rotate as a unit. However, when shift key member 700 is rotated, cam followers 740 on shift key member 700 move to second cam step 751 on first sun gear 160 as shown in FIG. 9. In this position, planet gear carrier engaging splines 622 on clutch ring 623 disengage from clutch engaging splines 621 on planet gear carrier 550 so that planet gear carrier 550 no longer is coupled directly to driver 70.

Shift key member guide 704 also includes a shift control sleeve coupling opening 752 for coupling to an end 756 of shift control sleeve 288. Saver spring 708 and spring washer 712 both are disposed radially inwardly within side wall 748 of shift key member guide 704, wherein a first end 756 of saver spring 708 is retained to an axially extending spring ledge 760 formed on shift key member guide 704, and a second end 764 of saver spring 708 is retained to a side edge of a sleeve coupling ledge 768 formed on spring washer 712.

A first end 772 of return spring 716 is retained to a spring ledge 776 formed on spring washer 712, and a second end 780 of return spring 716 is retained to a spring ledge 784 on spring washer 724. Spring washer 724 includes radially inwardly extending and diametrically opposed axle engaging projections 792 that are fitted within diametrically opposed axle grooves 796 formed in axle 36 (only one such groove 796 is shown in FIG. 7) so that spring washer 724 is nonrotatably coupled to axle 36. As a result of the nonrotatable coupling of spring washer 724 on axle 36, return spring 716 biases spring washer 712 clockwise relative to spring washer 724.

Diametrically opposed left side coupling legs 800 on shift sleeve 720 nonrotatably engage complementary recesses 804 in sleeve coupling ledges 768 on spring washer 712 (only one such sleeve coupling ledge 768 is shown in FIG. 7), and diametrically opposed right side coupling legs 808 on shift sleeve 720 extend through central opening 812 in spring washer 724 and nonrotatably engage complementary shift sleeve coupling recesses 816 in pawl support 728. Thus, spring washer 712, shift sleeve 720 and pawl support 728 rotate as a unit.

Diametrically opposed pawls 820 are rotatably mounted through C-clips 822 to pawl support pins 824 which, in turn, are mounted to spring washer 728. Similarly, pawl bias springs 828 are mounted around spring support pins 829 and held in place through C-clips 830. Each pawl bias spring 828 has one end 832 engaging a spring retaining ledge 836 on pawl support 728 and another end 840 engaging its respective pawl 820 to bias pawl ends 844 radially outwardly. Pawl control washer 736 includes diametrically opposed and axially extending pawl control ledges 850 that ordinarily press pawls 820 radially inwardly. When pawl control ledges 850 move away from pawls 820 as described in more detail below, pawls 820 swing radially outwardly and engage with ratchet teeth 882 of an assist cam 854 (FIG. 9).

Figure 10:
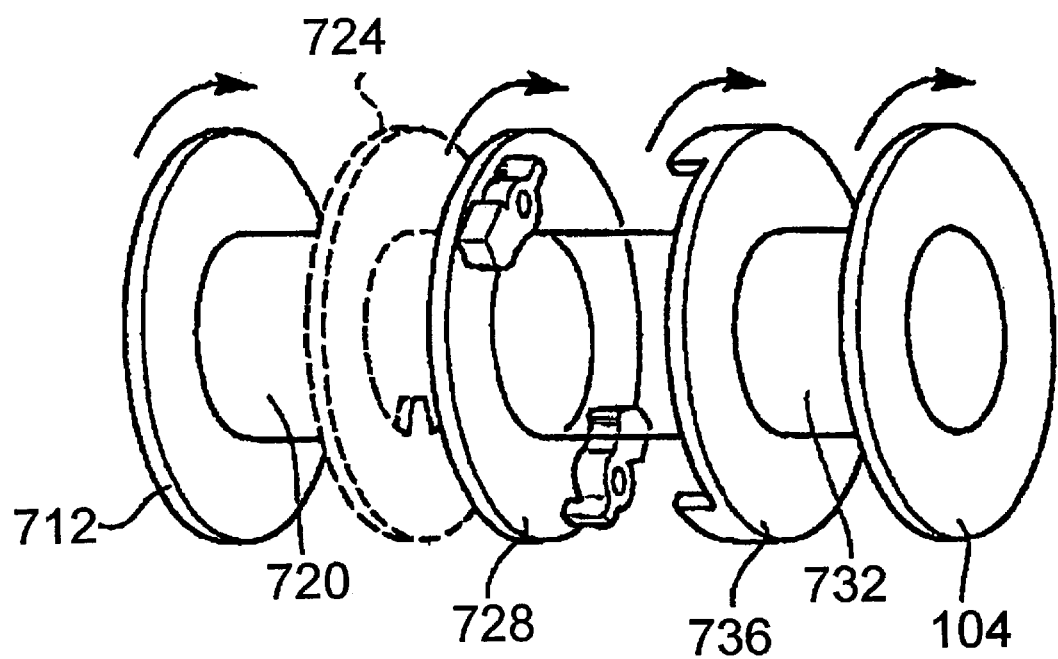
FIG. 10 is a schematic view illustrating the biasing of the shift/assist mechanism.
Figure 14:
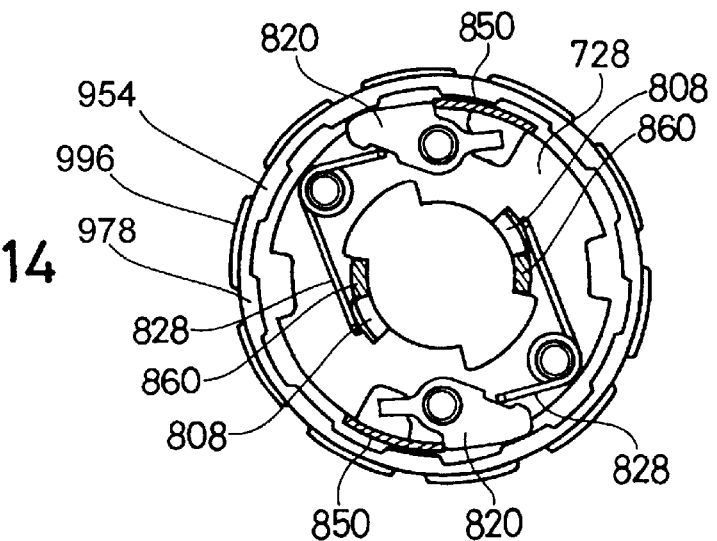
FIG. 14 is a view taken along line XIV—XIV in FIG. 8 showing the shift/assist mechanism in an inoperative state.

Diametrically opposed left side coupling legs 860 on shift sleeve 732 contact the diametrically opposed right side coupling legs 808 on shift sleeve 720 (as shown in FIG. 14), and diametrically opposed right side coupling legs 868 on shift sleeve 732 nonrotatably extend through coupling recesses 872 in pawl control washer 736 and though opening 876 in bearing cone 102 and nonrotatably engage complementary shift sleeve coupling recesses 880 in actuator plate 104. Thus, shift sleeve 732, pawl control washer 736 and actuator plate 104 rotate as a unit. However, shift sleeve 732 can rotate clockwise relative to shift sleeve 720 and pawl support 728 as discussed more fully below. Since return spring 716 biases spring washer 712 clockwise relative to spring washer 724, since spring washer 712 is coupled to pawl support 728 through shift sleeve 720, and since pawl control washer 736 is coupled to actuator plate 104 through shift sleeve 732, actuator plate 104 also has a net clockwise bias as shown schematically in FIG. 10. Given the initial clockwise start position of actuator plate 104, the transmission paths in power transmitting mechanism 82 are subsequently selected by rotating actuator plate 104 counterclockwise.

A power control mechanism 950 controls the amount of power communicated from driver 70 to shift control sleeve 288 to avoid damage to shift control sleeve 288 in the event shift control sleeve 288 is unable to complete the shift. As shown more clearly in FIGS. 8 and 9, power control mechanism 950 comprises an annular assist cam 954 maintained in place by an annular stopper plate 958 and a lock ring 962, a pair of annular first power control members 966 operatively coupled for rotation with driver 70, a pair of annular second power control members 970 operatively coupled for rotation with assist cam 954 and a power control biasing device in the form of a pair of wave washers 974 for biasing first power control members 966 and second power control members 970 toward each other.

Figure 11:
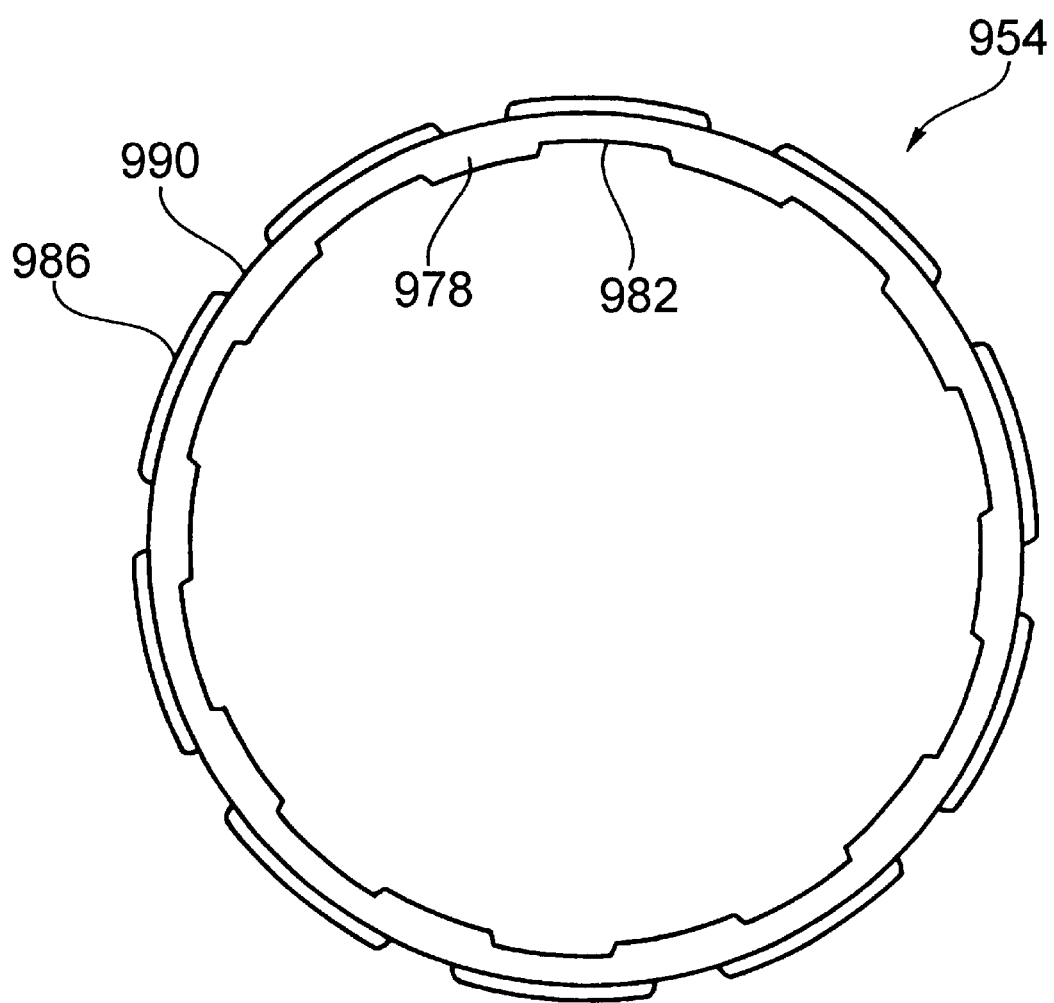
FIG. 11 is a front view of a particular embodiment of an assist cam according to the present invention.
Figure 12:
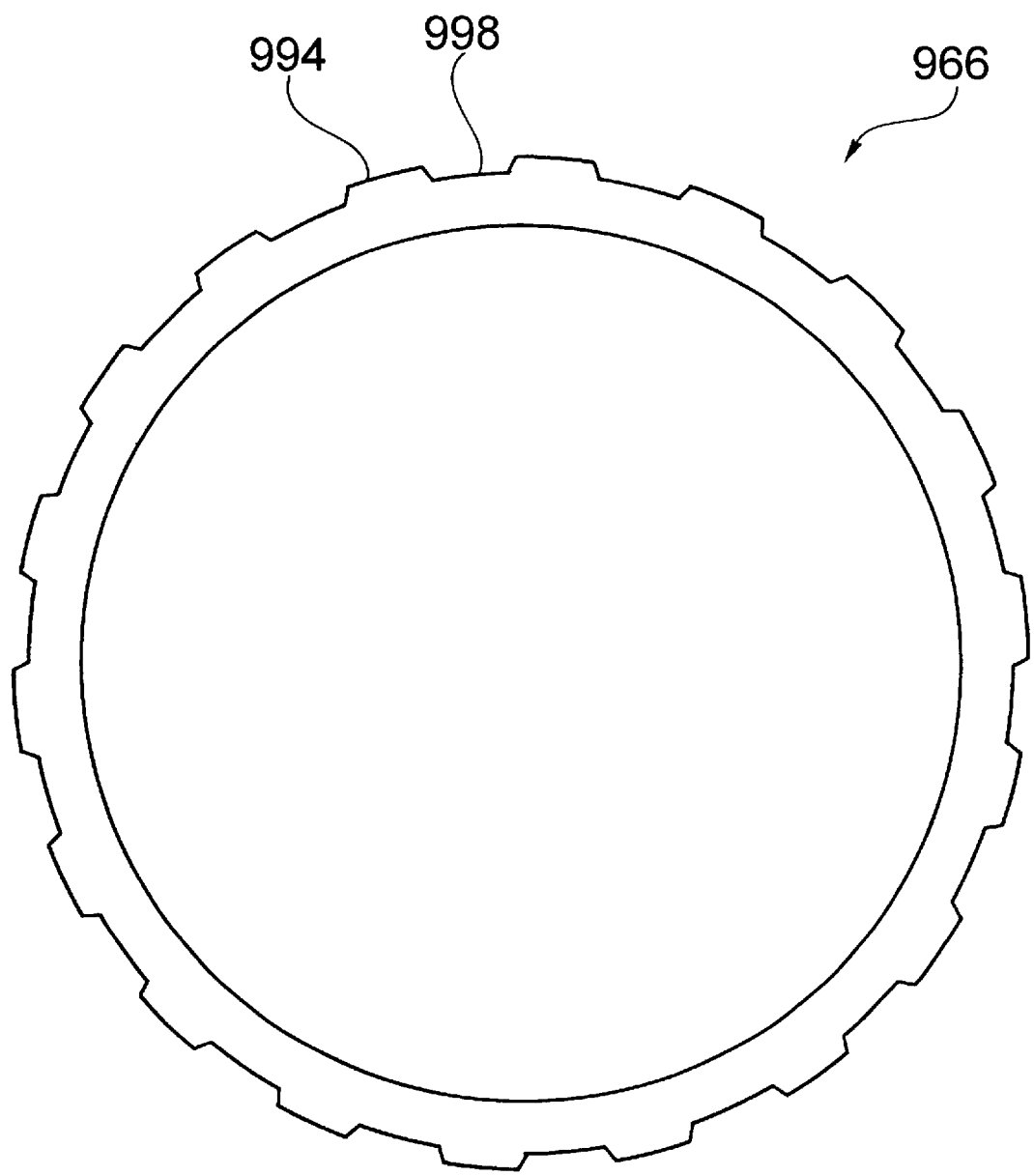
FIG. 12 is a front view of a particular embodiment of a first power control member according to the present invention.
Figure 13:
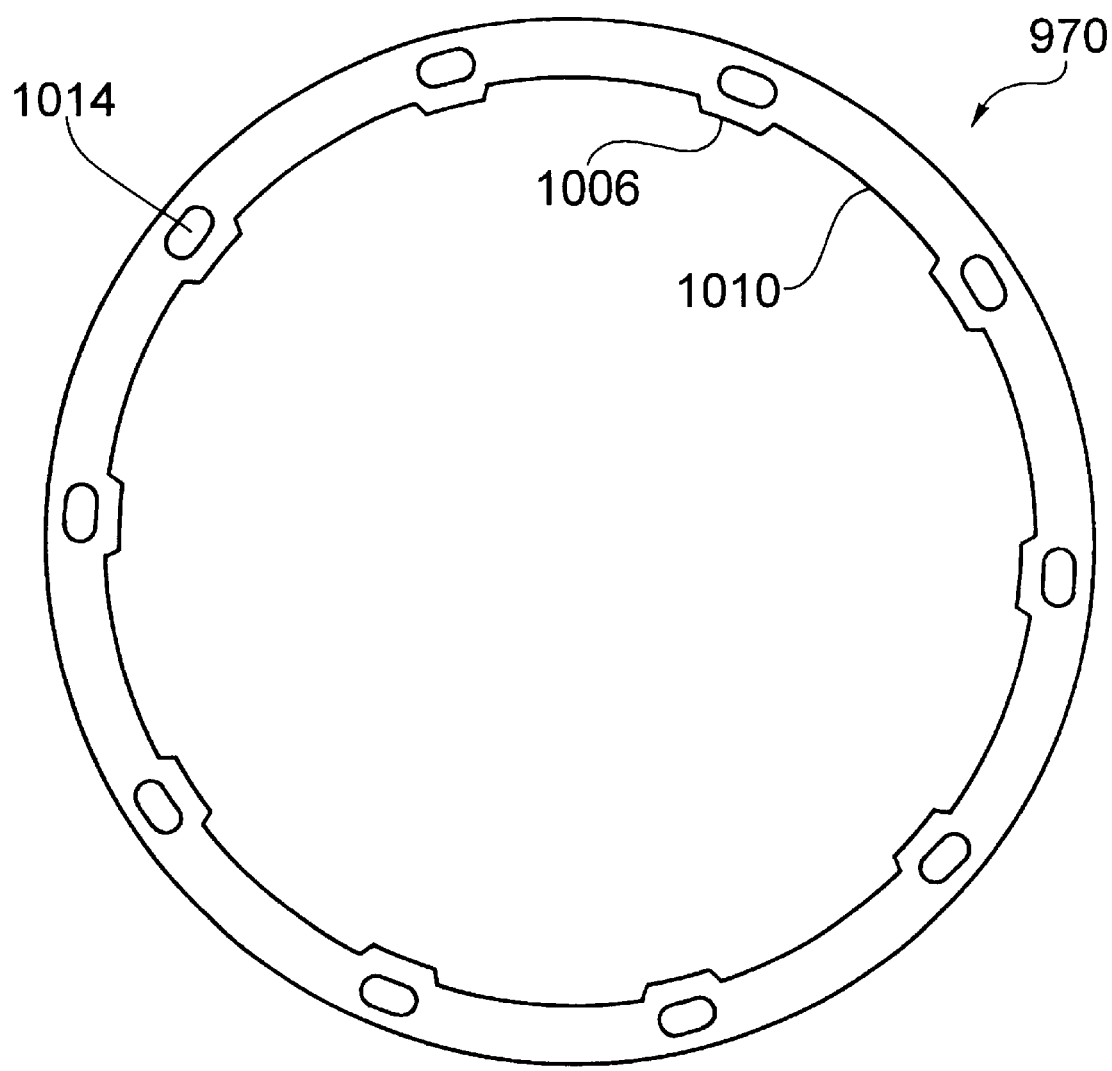
FIG. 13 is a front view of a particular embodiment of a second power control member according to the present invention.

As shown in FIG. 11, assist cam 954 includes a plurality of ratchet teeth 978 disposed on an inner peripheral surface 982 for engaging pawls 820 in a manner described below, and a plurality of assist cam splines 986 disposed on an outer peripheral surface 990. As shown in FIG. 12, each first power control member 966 includes a plurality of first power control member splines 994 disposed on an outer peripheral surface 998. First power control member splines 994 slidingly engage a corresponding plurality of driver splines 1002 formed on an inner peripheral surface of driver 70 so that first power control member 966 rotates together with driver 70 but is capable of axial movement relative to driver 70. As shown in FIG. 13, second power control member 970 includes a plurality of second power control member splines 1006 disposed on an inner peripheral surface 1010. Second power control member splines 1006 slidingly engage the plurality of assist cam splines 986 on assist cam 954 so that second power control member 970 rotates together with assist cam 954 but is capable of axial movement relative to assist cam 954. Second power control member 970 also includes a plurality of circumferentially disposed openings 1014 that can serve to retain a lubricating grease.

In the assembled state, first power control members 966 interleave with second power control members 970 and are pressed together by wave washers 974 so that first power control members 966 and second power control members 970 contact each other. Thus, driver 70, first power control members 966 second power control members 970 and assist cam 954 rotate together as a unit unless assist cam 954 and second power control members 970 significantly resist the rotation of driver 70 and first power control members 966 whereupon the frictional contact force between first power control members 966 and second power control members 970 is overcome and assist cam 954 and second power control members 970 rotate relative to driver 70 and first power control members 966. In general, and not to be limited thereto, actuator plate 104 and shift control sleeve 288 can be considered an example of a shift mechanism, and return spring 716, shift sleeve 720, shift sleeve 732, pawl support 728, pawls 820, pawl bias springs 828 and pawl control washer 736 can be considered an example of a shift assist mechanism.

Operation of the hub will now be described. The coupling of the various components for each speed stage is shown in Table 1, and the power transmission path for each speed stage is shown in Table 2:

TABLE 1

| Speed Stage | Clutch Ring 623 | Sun Gear 164 | Sun Gear 168 | Sun Gear 172 | Gear Ratio |
|---|---|---|---|---|---|
| 1 (Low) | Disengaged | Free | Free | Free | 0.53 |
| 2 | Disengaged | Free | Free | Locked | 0.64 |
| 3 | Disengaged | Free | Locked | Free | 0.74 |
| 4 | Disengaged | Locked | Locked | Free | 0.85 |
| 5 | Engaged | Free | Free | Free | 1.0 |
| 6 | Engaged | Free | Free | Locked | 1.22 |
| 7 | Engaged | Free | Locked | Free | 1.42 |
| 8 (High) | Engaged | Locked | Free | Free | 1.62 |

TABLE 2

| Speed Stage | Power Transmission Path |
|---|---|
| 1 | Driver 70 → Pawl 587 → First Ring Gear 551 → Planet Gear Carrier 550 (planet gear 579 rotates around first sun gear 160) → Pawl 908 → Hub Shell 74 |
| 2 | Driver 70 → Pawl 587 → First Ring Gear 551 → Planet Gear Carrier 550 (planet gear 579 rotates around first sun gear 160 and planet gear 608 rotates around fourth sun gear 172) → Second Ring Gear 553 → Roller Clutch 628 → Hub Shell 74 |
| 3 | Driver 70 → Pawl 587 → First Ring Gear 551 → Planet Gear Carrier 550 (planet gear 579 rotates around first sun gear 160 and planet gear 608 rotates around third sun gear 168) → Second Ring Gear 553 → Roller Clutch 628 → Hub Shell 74 |
| 4 | Driver 70 → Pawl 587 → First Ring Gear 551 → Planet Gear Carrier 550 (planet gear 579 rotates around first sun gear 160 and planet gear 608 rotates around second sun gear 164) → Second Ring Gear 553 → Roller Clutch 628 → Hub Shell 74 |
| 5 | Driver 70 → Clutch Ring 623 → Planet Gear Carrier 550 → Pawl 908 → Hub Shell 74 |
| 6 | Driver 70 → Clutch Ring 623 → Planet Gear Carrier 550 (planet gear 608 rotates around fourth sun gear 172) → Second Ring Gear 553 → Roller Clutch 628 → Hub Shell 74 |
| 7 | Driver 70 → Clutch Ring 623 → Planet Gear Carrier 550 (planet gear 608 rotates around third sun gear 168) → Second Ring Gear 553 → Roller Clutch 628 → Hub Shell 74 |
| 8 | Driver 70 → Clutch Ring 623 → Planet Gear Carrier 550 (planet Gear 608 rotates around second sun gear 164) → Second Ring Gear 553 → Roller Clutch 628 → Hub Shell 74 |

When shifting from speed stage 4 to speed stage 5, such as when the bicycle is accelerating, the timing of the coupling mechanisms are set to follow the following sequence:

| Speed Stage | Clutch Ring 623 | Sun Gear 164 | Sun Gear 168 | Sun Gear 172 |
|---|---|---|---|---|
| 4 | Disengaged | Locked | Locked | Free |
| (same as 3) | Disengaged | Free | Locked | Free |
| (same as 7) | Engaged | Free | Locked | Free |
| 5 | Engaged | Free | Free | Free |

Thus, when the bicycle is accelerating and the cyclist shifts from speed stage 4 to speed stage 5, third sun gear 168 is temporarily locked, and then second sun gear 164 is released first to create the same state as speed stage 3. The rider would perceive this as a slight acceleration of the pedals, but that is expected when the bicycle is accelerating. Then, clutch ring 623 is engaged with planet gear carrier 550 to create the same state as speed stage 7. The rider would perceive this as a deceleration of the pedals, which is expected when the transmission shifts to a higher gear ratio. Thereafter, third sun gear 168 is released to produce the desired speed stage 4. If the sun gears were released before clutch ring 623 were engaged, then the transmission would be in the same state as speed stage 1, which would produce very undesirable rapid acceleration of the pedals and a significant shock when the transmission completes the shift to speed stage 5.

This sequence also has particular benefit when the bicycle is decelerating and the rider wishes to shift from speed stage 5 to speed stage 4. In this case, the temporary transition from speed stage 5 to speed stage 7 causes a deceleration of the pedals, but that is better than if clutch ring 623 were disengaged first. If clutch ring 623 were disengaged first, then the transmission would be in the same state as speed stage 1, with rapid acceleration of the pedals. Such rapid acceleration of the pedals is undesirable when climbing a hill, for example. Thereafter, the transmission makes a temporary transition from speed stage 7 to speed stage 3. This produces an acceleration of the pedals, but since speed stage 3 is adjacent to speed stage 4 which the cyclist was just in, the transition is much more acceptable. Thereafter, the transmission makes the transition to the desired speed stage 4. The overall shift from speed stage 5 to speed stage 4 thus avoids excessive acceleration or deceleration of the pedals under conditions when such rapid acceleration or deceleration is least desired.

Figure 15:
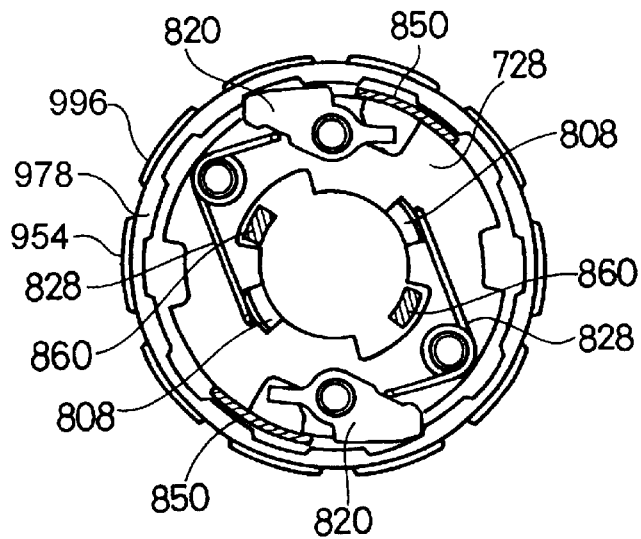
FIG. 15 is a view taken along line XIV—XIV in FIG. 8 showing the shift/assist mechanism in an operative state.
Figure 16:
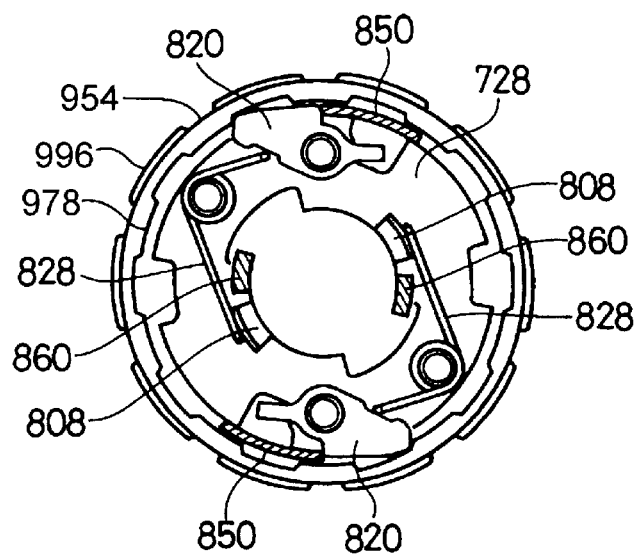
FIG. 16 is a view taken along line XIV—XIV in FIG. 8 showing the shift/assist mechanism moving back toward the inoperative state.

As noted previously, shift/assist mechanism 90 also uses the rotational power of driver 70 to help change the power transmission paths in power transmitting mechanism 82. This is desirable when significant drive force is applied to sprocket 54 and causes great resistance to the coupling or uncoupling of the various components. During normal operation, actuator plate 104, shift sleeve 732, pawl control washer 736, pawl support 728, shift sleeve 720, spring washer 712, shift key member guide 704 and shift control sleeve 288 rotate as a unit to couple and uncouple the various components. As a result, the positions of coupling legs 860 of shift sleeve 732, pawl control ledges 850 of pawl control washer 736, pawls 820 and coupling legs 808 of shift sleeve 720 are as shown in FIG. 14. In this state pawls 820 are disengaged from ratchet teeth 978 on assist cam 954. However, when significant drive force is applied to sprocket 54 and causes significant resistance to the operation of shift control sleeve 288, shift control sleeve 288 tends to remain stationary despite rotation of actuator plate 104. In this case shift sleeve 732 rotates clockwise relative to shift sleeve 720, thus causing pawl control washer 736 to rotate clockwise relative to pawl support 728 so that pawl control ledges 850 move away from pawls 820 as shown in FIG. 15. As a result, pawls 820 rotate radially outwardly and engage ratchet teeth 978 on assist cam 854 so that pawl support 728 rotates together with assist cam 854 and driver 70. This, in turn, provides an assisting force to rotate shift sleeve 720, shift key member guide 704 and shift control sleeve 288 to complete the shifting operation. When the resistance from shift control sleeve 288 is overcome, pawl support 728 rotates clockwise relative to pawl control washer 736 as shown in FIG. 16 until the shift operation is complete and the state resumes to that shown in FIG. 14. As noted previously, driver 70, first power control members 966, second power control members 970 and assist cam 954 rotate together as a unit unless assist cam 954 and second power control members 970 significantly resist the rotation of driver 70 and first power control members 966. That would happen if shift control sleeve 288 is unable to rotate or otherwise complete the shift. To avoid damage to the components, the frictional contact force between first power control members 966 and second power control members 970 is overcome upon such excessive resistance so that assist cam 954 and second power control members 970 rotate relative to driver 70 and first power control members 966. The shift then can complete when the rider decreases the pedal resistance and the components can operate normally.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A hub transmission for a bicycle comprising:
   a hub axle;
   a driver rotatably supported to the hub axle;
   a hub shell rotatably supported to the hub axle;
   a power transmitting mechanism disposed between the driver and the hub shell for communicating rotational power from the driver to the hub shell through a plurality of power transmission paths;
   a shift mechanism for selecting the plurality of power transmission paths;
   a shift assist mechanism for communicating rotational power from the driver to the shift mechanism; and
   a power control mechanism disposed between the driver and the shift assist mechanism and coupling the driver to the shift assist mechanism for controlling an amount of rotational power communicated from the driver to the shift mechanism to prevent locking between the driver and the shift mechanism when the shift assist mechanism engages the driver to communicate rotational power from the driver to the shift mechanism and the shift mechanism provides excessive resistance to the shift assist mechanism.

2. The hub transmission according to claim 1 wherein the shift mechanism comprises:
   an actuator member rotatably supported by the hub axle; and
   a shift control sleeve rotatably supported by the hub axle, wherein the shift control sleeve is operatively coupled to the actuator member for rotating in response to the rotation of the actuator member.

3. The hub transmission according to claim 2 wherein the shift assist mechanism communicates rotational power from the driver to the shift control sleeve.

4. The hub transmission according to claim 3 wherein the shift assist mechanism comprises:
   a first shift member coupled for rotation with the actuator member;
   a second shift member coupled for rotation with the shift control sleeve; and
   a biasing device that biases the first shift member and the second shift member towards each other so that the first shift member rotates together with the second shift member until the shift control sleeve significantly resists rotation of the actuator member whereupon the first shift member rotates relative to the second shift member.

5. The hub transmission according to claim 4 wherein the shift assist mechanism further comprises:
   a pawl coupled to one of the first shift member and the second shift member for movement between an engaged position wherein the pawl engages the power control mechanism and a disengaged position wherein the pawl is disengaged from the power control mechanism;

a pawl biasing member for biasing the pawl toward the engaged position; and a pawl control member coupled to the other one of the first shift member and the second shift member for maintaining the pawl in the disengaged position when the first shift member rotates together with the second shift member and for allowing the pawl to move to the engaged position when the first shift member rotates relative to the second shift member.

6. The hub transmission according to claim 1 wherein the power control mechanism comprises:

a first power control member operatively coupled to the driver for rotation in response to rotation of the driver; and a second power control member engaging the first power control member so that the first power control member rotates together with the second power control member until the second power control member significantly resists rotation of the first power control member whereupon the first power control member rotates relative to the second power control member.

7. A hub transmission for a bicycle comprising:

a hub axle a driver rotatably supported to the hub axle:

a hub shell rotatably supported to the hub axle:

a power transmitting mechanism disposed between the driver and the hub shell for communicating rotational power from the driver to the hub shell through a plurality of power transmission paths;

a shift mechanism for selecting the plurality of power transmission paths;

a shift assist mechanism for communicating rotational power from the driver to the shift mechanism; and a power control mechanism disposed between the driver and the shift assist mechanism and coupling the driver to the shift assist mechanism for controlling an amount of rotational power communicated from the driver to the shift mechanism, wherein the power control mechanism comprises:

a first power control member operatively coupled to the driver for rotation in response to rotation of the driver; and a second power control member engaging the first power control member so that the first power control member rotates together with the second power control member until the second power control member significantly resists rotation of the first power control member whereupon the first power control member rotates relative to the second power control member;

wherein the first power control member contacts the second power control member.

8. The hub transmission according to claim 7 wherein the power control mechanism further comprises a power control biasing member for biasing the first power control member and the second power control member towards each other.

9. A hub transmission for a bicycle comprising:

a hub axle;

a driver rotatably supported to the hub axle;

a hub shell rotatably supported to the hub axle;

a power transmitting mechanism disposed between the driver and the hub shell for communicating rotational power from the driver to the hub shell through a plurality of power transmission paths;

a shift mechanism for selecting the plurality of power transmission paths;

a shift assist mechanism for communicating rotational power from the driver to the shift mechanism; and a power control mechanism disposed between the driver and the shift assist mechanism and coupling the driver to the shift assist mechanism for controlling an amount of rotational power communicated from the driver to the shift mechanism, wherein the power control mechanism comprises:

a first power control member operatively coupled to the driver for rotation in response to rotation of the driver;

a second power control member engaging the first power control member so that the first power control member rotates together with the second power control member until the second power control member significantly resists rotation of the first power control member whereupon the first power control member rotates relative to the second power control member; and an assist cam for supporting the second power control member, wherein the assist cam includes a plurality of ratchet teeth.

10. The hub transmission according to claim 9 wherein the second power control member is axially movable.

11. The hub transmission according to claim 10 wherein the assist cam has an annular shape, wherein the second power control member has an annular shape, wherein the plurality of ratchet teeth are disposed on an inner peripheral surface of the assist cam, and wherein an outer peripheral surface of the assist cam forms a plurality of assist cam splines that engage a corresponding plurality of second power control member splines formed on an inner peripheral surface of the second power control member.

12. The hub transmission according to claim 11 wherein the assist cam has exactly 10 ratchet teeth.

13. The hub transmission according to claim 11 wherein the first power control member contacts the second power control member.

14. The hub transmission according to claim 13 wherein the power control mechanism further comprises a power control biasing member for biasing the first power control member and the second power control member towards each other.

15. The hub transmission according to claim 10 wherein the first power control member is axially movable.

16. The hub transmission according to claim 15 wherein the driver has an annular shape, wherein the first power control member has an annular shape, and wherein an inner peripheral surface of the driver forms a plurality of driver splines that engage a corresponding plurality of first power control member splines formed on an outer peripheral surface of the first power control member.

17. The hub transmission according to claim 16 wherein the assist cam has an annular shape, wherein the second power control member has an annular shape, wherein the plurality of ratchet teeth are disposed on an inner peripheral surface of the assist cam, and wherein an outer peripheral surface of the assist cam forms a plurality of assist cam splines that engage a corresponding plurality of second power control member splines formed on an inner peripheral surface of the second power control member.

18. The hub transmission according to claim 17 wherein the assist cam has exactly 10 ratchet teeth.

19. The hub transmission according to claim 17 wherein the first power control member contacts the second power control member.

20. The hub transmission according to claim 19 wherein the power control mechanism further comprises a power control biasing member for biasing the first power control member and the second power control member towards each other.

21. The hub transmission according to claim 9 wherein the shift mechanism comprises:

an actuator member rotatably supported by the hub axle; and a shift control sleeve rotatably supported by the hub axle, wherein the shift control sleeve is operatively coupled to the actuator member for rotating in response to the rotation of the actuator member.

22. The hub transmission according to claim 21 wherein the shift assist mechanism communicates rotational power from the driver to the shift control sleeve.

23. The hub transmission according to claim 22 wherein the shift assist mechanism comprises:

a first shift member coupled for rotation with the actuator member;

a second shift member coupled for rotation with the shift control sleeve; and a biasing device that biases the first shift member and the second shift member towards each other so that the first shift member rotates together with the second shift member until the shift control sleeve significantly resists rotation of the actuator member whereupon the first shift member rotates relative to the second shift member.

24. The hub transmission according to claim 23 wherein the shift assist mechanism further comprises:

a pawl coupled to one of the first shift member and the second shift member for movement between an engaged position wherein the pawl engages the ratchet teeth of the assist cam and a disengaged position wherein the pawl is disengaged from the ratchet teeth;

a pawl biasing member for biasing the pawl toward the engaged position; and a pawl control member coupled to the other one of the first shift member and the second shift member for maintaining the pawl in the disengaged position when the first shift member rotates together with the second shift member and for allowing the pawl to move to the engaged position when the first shift member rotates relative to the second shift member.

25. The hub transmission according to claim 24 wherein the second power control member is axially movable.

26. The hub transmission according to claim 25 wherein the assist cam has an annular shape, wherein the second power control member has an annular shape, wherein the plurality of ratchet teeth are disposed on an inner peripheral surface of the assist cam, and wherein an outer peripheral surface of the assist cam forms a plurality of assist cam splines that engage a corresponding plurality of second power control member splines formed on an inner peripheral surface of the second power control member.

27. The hub transmission according to claim 26 wherein the assist cam has exactly 10 ratchet teeth.

28. The hub transmission according to claim 26 wherein the first power control member contacts the second power control member.

29. The hub transmission according to claim 28 wherein the power control mechanism further comprises a power control biasing member for biasing the first power control member and the second power control member towards each other.

30. The hub transmission according to claim 25 wherein the first power control member is axially movable.

31. The hub transmission according to claim 30 wherein the driver has an annular shape, wherein the first power control member has an annular shape, and wherein an inner peripheral surface of the driver forms a plurality of driver splines that engage a corresponding plurality of first power control member splines formed on an outer peripheral surface of the first power control member.

32. The hub transmission according to claim 31 wherein the assist cam has an annular shape, wherein the second power control member has an annular shape, wherein the plurality of ratchet teeth are disposed on an inner peripheral surface of the assist cam, and wherein an outer peripheral surface of the assist cam forms a plurality of assist cam splines that engage a corresponding plurality of second power control member splines formed on an inner peripheral surface of the second power control member.

33. The hub transmission according to claim 32 wherein the assist cam has exactly 10 ratchet teeth.

34. The hub transmission according to claim 32 wherein the first power control member contacts the second power control member.

35. The hub transmission according to claim 34 wherein the power control mechanism further comprises a power control biasing member for biasing the first power control member and the second power control member towards each other.

* * * * *